United States Patent
Nilson et al.

(12)

(10) Patent No.: US 6,508,608 B1
(45) Date of Patent: Jan. 21, 2003

(54) MATERIAL TREATMENT METHOD AND APPARATUS

(75) Inventors: Ron Nilson, Seattle, WA (US); Thomas C. Stone, Seattle, WA (US)

(73) Assignee: Tracsaw Manufacturing, Inc., Seattle, WA (US)

( * ) Notice: Subject to any disclaimer, the term of this patent is extended or adjusted under 35 U.S.C. 154(b) by 0 days.

(21) Appl. No.: 09/628,409

(22) Filed: Aug. 1, 2000

(51) Int. Cl.$^7$ .............................. E02F 3/00; E02F 5/00; B09C 1/08

(52) U.S. Cl. .............................. 405/128.5; 405/128.75; 37/462; 37/465; 37/355; 37/360

(58) Field of Search ..................... 405/128.1, 128.15, 405/128.45, 128.5, 128.7, 128.75, 164, 179; 37/142.5, 189, 355, 462, 360, 190, 463–465

(56) References Cited

U.S. PATENT DOCUMENTS

| | | | |
|---|---|---|---|
| 2,704,407 A | * 3/1955 | Talboys | 37/465 |
| 2,790,255 A | * 4/1957 | Riley et al. | 37/360 |
| 3,785,071 A | * 1/1974 | Schaeff | 37/360 |
| 3,787,989 A | * 1/1974 | Heckathorn | 37/360 |
| 3,813,125 A | 5/1974 | Sims et al. | 299/7 |
| 4,871,281 A | 10/1989 | Justice | 405/181 |
| 4,913,586 A | 4/1990 | Gabbita | 405/129 |
| 5,074,063 A | 12/1991 | Vannette | 37/191 A |
| 5,242,246 A | 9/1993 | Manchak, III et al. | 405/128 |
| 5,348,422 A | * 9/1994 | Manchak, III et al. | 405/128.35 |
| 5,631,160 A | 5/1997 | Bruso | 435/262.5 |
| 5,639,182 A | 6/1997 | Paris | 405/128 |
| 5,765,966 A | 6/1998 | White et al. | 405/174 |
| 5,830,752 A | 11/1998 | Bruso | 435/283.1 |
| 5,930,923 A | * 8/1999 | Nishiguchi | 37/355 X |

FOREIGN PATENT DOCUMENTS

WO 9425191 * 11/1994

OTHER PUBLICATIONS

Au & Ag Heat and Dump Leaching Practice, Operations, Proceedings from the 1983 SME Fall Meeting, Oct. 19–21, 1983, pp. 43–48, 69, 71–83.

Solution Mining, Robert W. Bartlett, pp. 1–15, 17–23, 25–53, 89–107, 237–261, 265–67.

* cited by examiner

*Primary Examiner*—Heather Shackelford
*Assistant Examiner*—Sunil Singh
(74) *Attorney, Agent, or Firm*—Stoel Rives LLP

(57) ABSTRACT

An apparatus and method are provided for treating base materials, such as ore of a leach pad in a precious metal mining operation. A tilling head of the apparatus includes a cutter having a cutting face for engaging and loosening compacted base materials. The tilling head is extended into the base material down to a tilling depth so that the cutter moves loosened base material up and over the top of the tiller apparatus before depositing it in a pile opposite the cutting face. The loosened base material is deposited a distance from the tilling head that is sufficient to create a void between the tilling head and the pile that extends down to the tilling depth to prevent the loosened base material from being disturbed by the tilling head. The tilling head can be positioned so that the cutting face undercuts the base material to thereby assist the cutter in moving the loosened base material and increase the distance between the tilling head and the pile. An additive delivery system of the apparatus applies an additive, such as a leaching agent, remediation agent, or agglomerating agent, to the loosened base material as it is tilled and deposited by the tilling head. As it is deposited onto the pile, the loosened base material forms a slope having an incline substantially equal to the angle of repose so that the slope serves as a mixing area to improve coverage of the additive throughout the loosened base material.

18 Claims, 9 Drawing Sheets

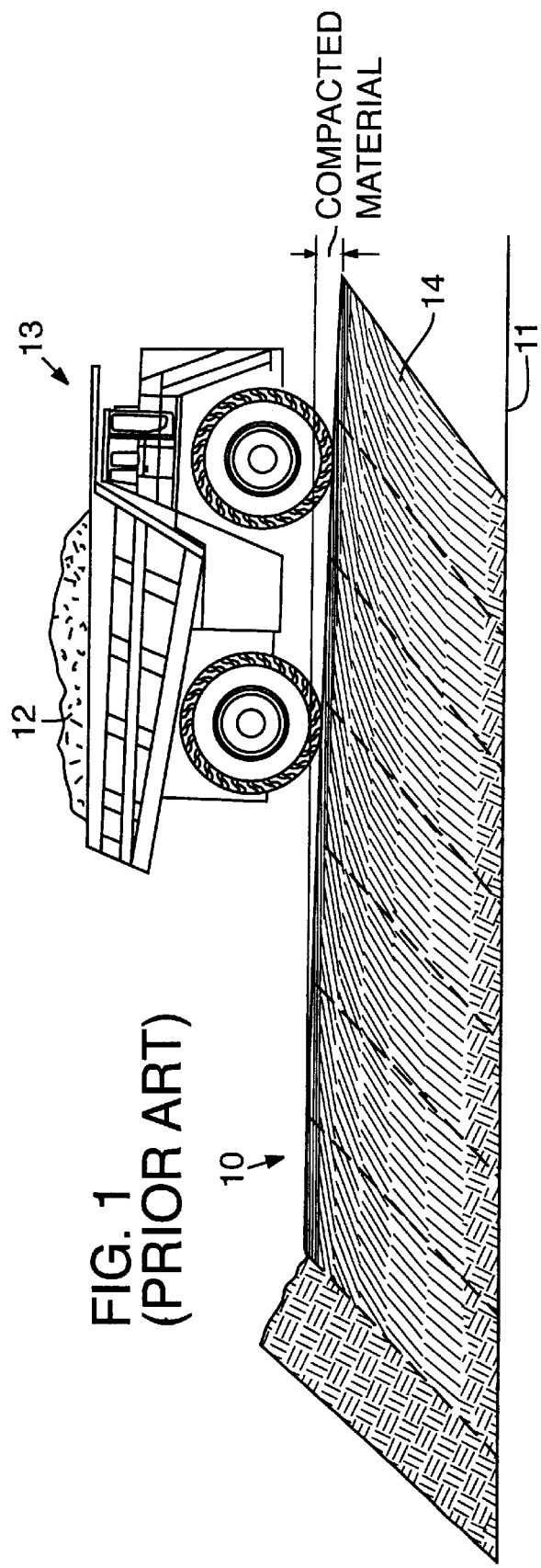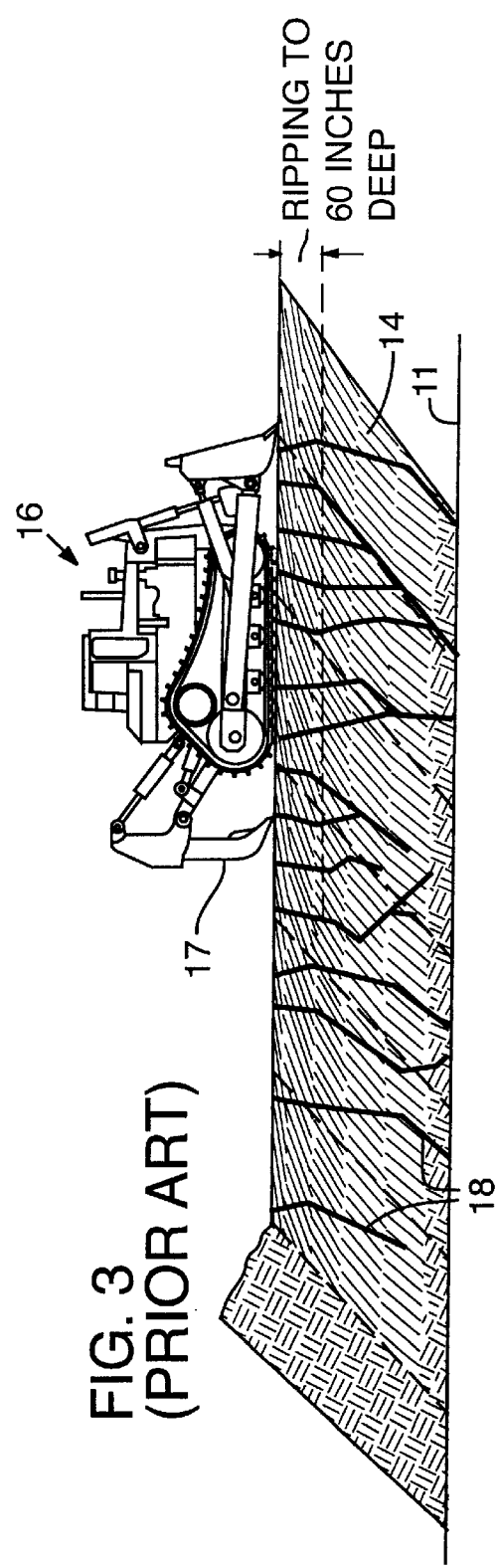
FIG. 1 (PRIOR ART)
FIG. 3 (PRIOR ART)

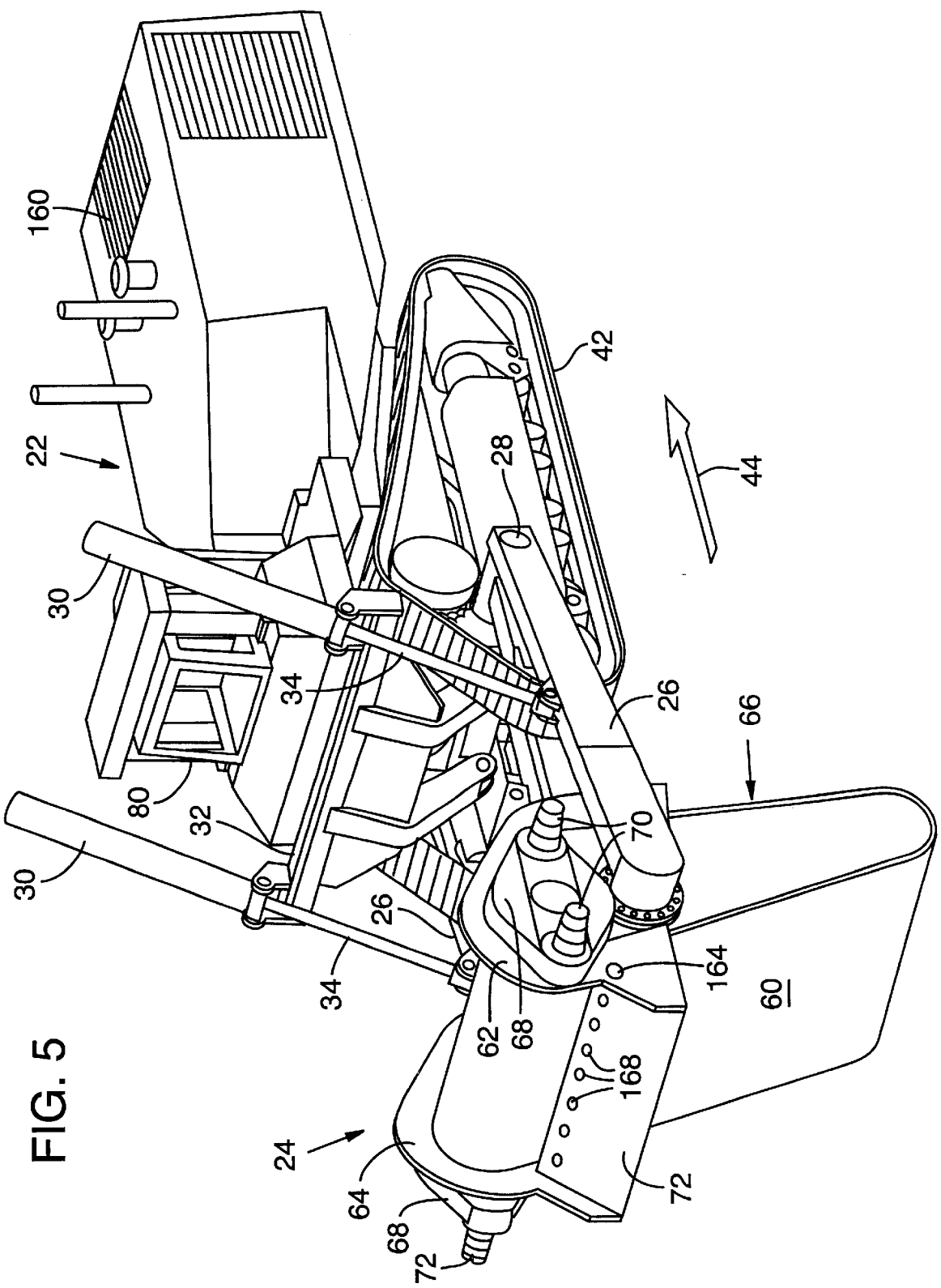

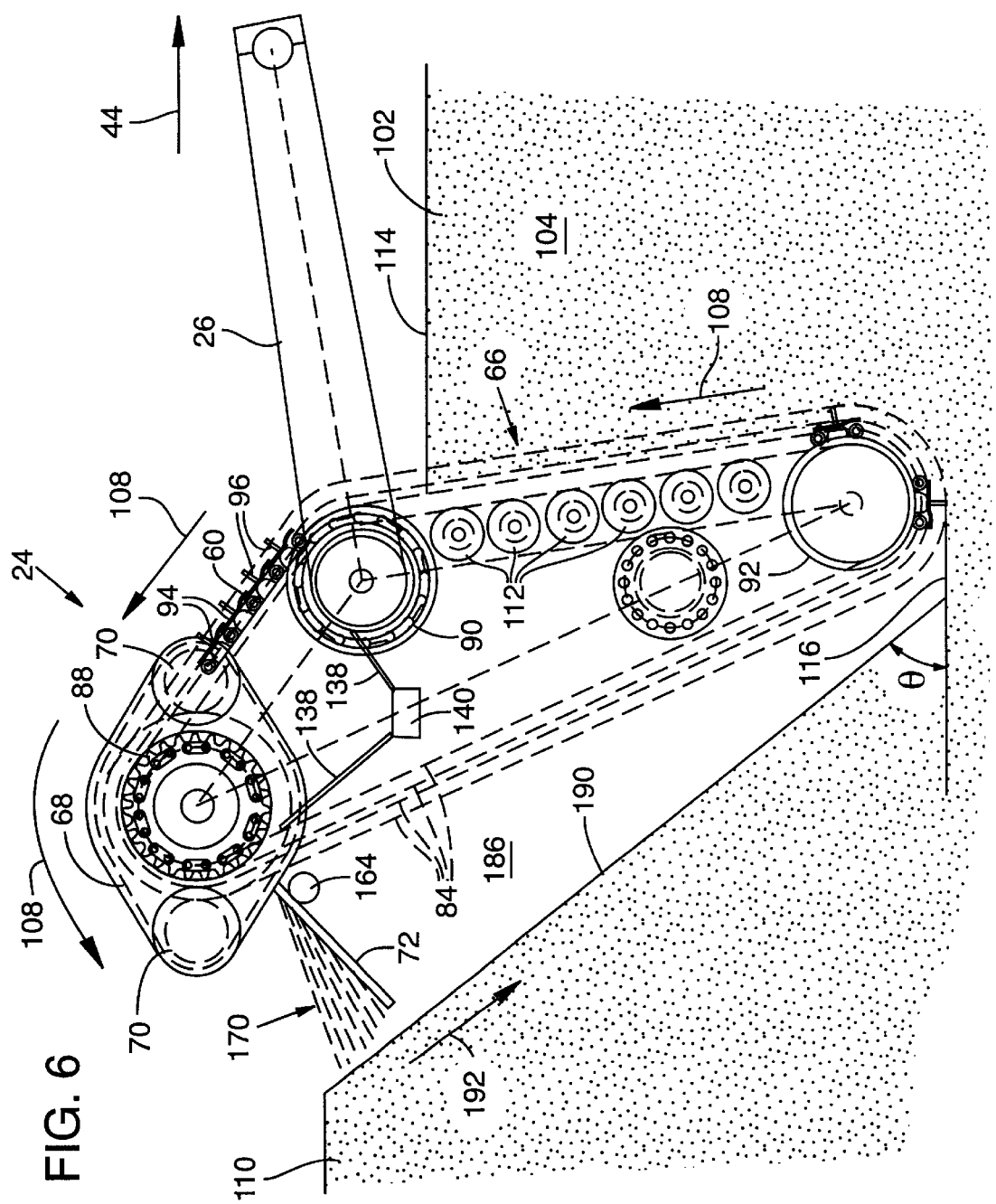

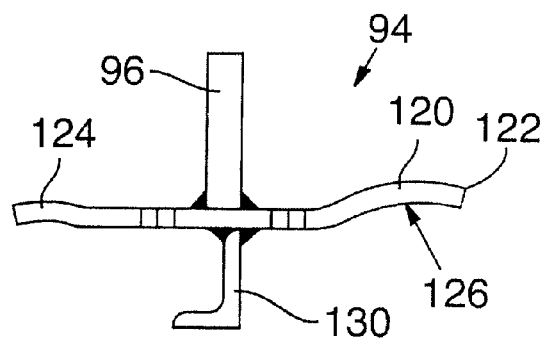
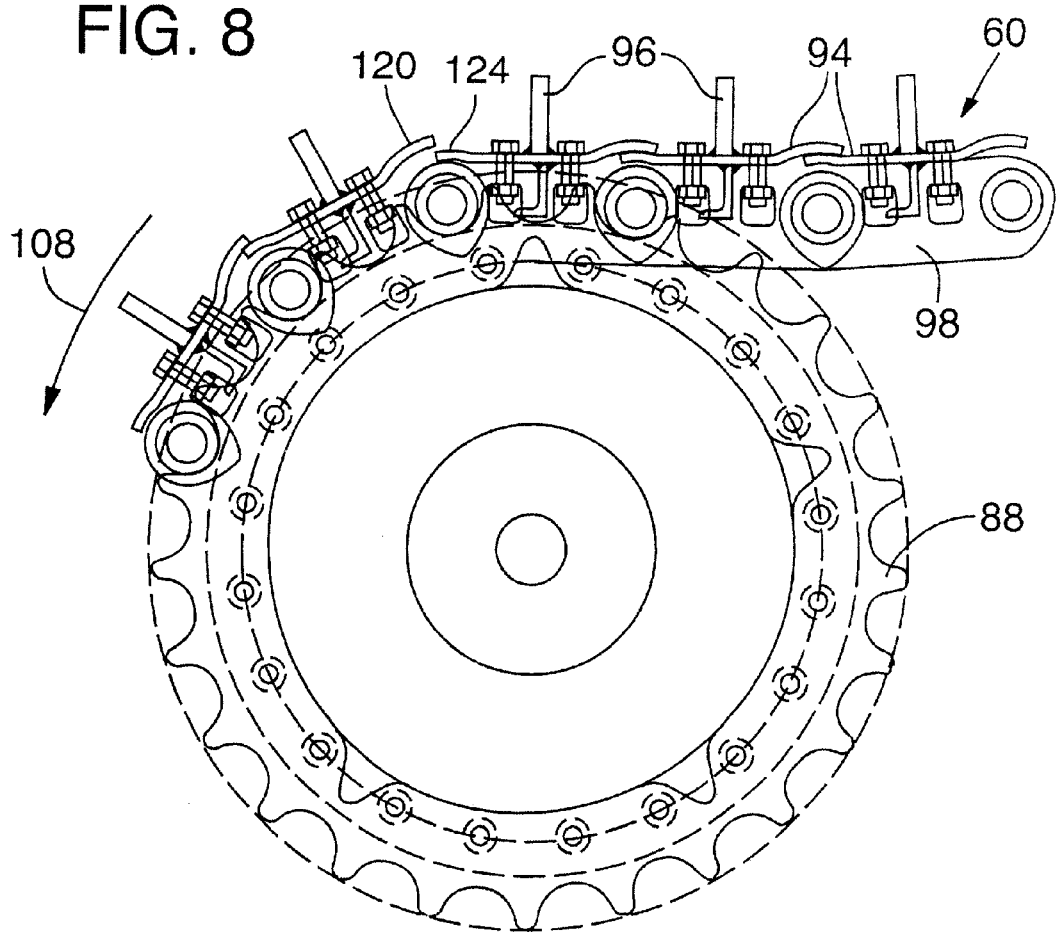

MATERIAL TREATMENT METHOD AND APPARATUS

FIELD OF THE INVENTION

The present invention is generally directed to the treatment of materials such as earthen materials and, in particular, to a method and apparatus for tilling base material in a manner that forms a mixing area where additives may be applied to and mixed with the tilled base material. The method and apparatus are particularly suitable for use in treatment of a leach pad of a precious metals mining operation.

BACKGROUND OF THE INVENTION

In many in-situ material treatment processes, it is desirable to reduce compaction of the material. Uncompacted material requires less energy and less additives to process, resulting in decreased environmental impact. Reduced compaction increases the permeability and effective surface area of the material, which can enhance the effects of additives that are often applied to the material in-situ to cause a change in the material. A need exists for improved methods and devices for reducing compaction and treating materials in-situ. Contaminated soil remediation and chemical leaching operations are two processes that can benefit from reduced compaction. Because opportunities for particularly significant economic and environmental benefits exist in a leaching process of a precious metals mining operation, the present invention will be described with reference to that process.

Mining for precious metals, such as, for example, gold, platinum, silver, and copper, commonly involves a leaching process that is used to extract these metals from a low grade raw ore. In such a mining operation, the ore is typically collected on a heap leach pad built on the surface of a relatively flat land area many acres in size. FIG. 1 is a side elevational view of a leach pad 10 being constructed in accordance with the prior art. FIG. 2 is a diagrammatic illustration of a multi-lift leach pad in accordance with the prior art. With reference to FIGS. 1 and 2, the leach pad 10 is constructed on a basin 11 having a crowned surface covered by a liner. The leach pad 10 is supplied with ore 12 brought in by large dump trucks 13 to form a layer of ore called a lift 14, typically having a depth of between 9 and 50 feet. After the lift 14 is formed, a liquid leaching agent is applied to the upper surface of the lift 14, usually by a sprinkler system (not shown). The leaching agent percolates through the lift 14 and dissolves or otherwise binds to metals in the ore. The laden leaching solution, often called the leachate or pregnant leachate, is contained by the liner and is collected at the perimeter of the leach pad 10 for transportation to a refining facility where the metals are chemically extracted from the laden leaching solution. When the concentration of metals in the leachate decreases to a certain level, a fresh lift of ore 15 (FIG. 2) is then deposited over the spent ore and the process is repeated. Multiple lifts are formed so that the leaching agent continues to percolate through the lower lifts to maximize the yield of the ore.

It is important that the lift be evenly permeable so that the leaching agent can percolate completely throughout the lift. However, the permeability of the lift decreases due to the way in which it is built. In building the lift, the dump trucks 13 may deliver, for example, 38,000 loads of raw ore with each load of raw ore weighing between 75 and 300 tons. The lift 14 is compacted by the weight of the trucks 13 as they drive over it to deliver each load of ore 12, as shown in FIG. 1. The compaction of the lift 14 is greatest near the upper surface of the lift and decreases with depth. Substantially all truck compaction is found in the top six to nine feet of the lift. Ideally, the ore would consist entirely of clean gravel that remains highly permeable, even when compacted. However, ore commonly includes fines, silts, and clay that form a less permeable matrix with the gravel when compacted. Poor permeability inhibits the free flow of the leaching agent through the lift and lessens the yield of the ore.

A ripper is typically used to break up the ore at the upper surface of the lift. A ripper is a bulldozer that drags a shank through the upper surface of the lift. FIG. 3 shows a prior-art ripper 16 with its shank 17 retracted. FIG. 2 shows the path followed by the ripper 16. Rippers have proven only partially effective in reducing compaction because they are typically unable to extend their shanks deeper than 60 inches. Additionally, known rippers have shanks that produce only a narrow path of ripped lift material, typically less than 6 inches wide. Because the shank 17 is narrow, the ripper 16 usually leaves pillars or cells of compacted ore between adjacent paths of the shank 17, resulting in less than optimal permeability of the leach pad. The liquid leaching agent will follow the path of least resistance as it filters through the lift. The compacted cells and pillars form flow channels 18 between them that shunt the flow of the leaching agent and can prevent it from percolating through entire sections of the lift. Hydrodynamic effects of flow channels can also cause fines and silts to form dams and lenses within the lift that further hinder leachate dispersion. Lenses (subsurface ponds) and dams reduce ore yield by producing a shadowing effect that leaves dry spots in the lift. Lenses and dams have lesser effect in shallow pads (9–20 ft. deep) because there is less material to be shadowed. In a taller lift, lenses formed near the top of the lift will shadow larger amounts of ore. On the other hand, the effects of flow channeling (in the absence of dams and lenses) are typically more pronounced in shallow pads (9–20 ft. deep) due to shorter soak times and the shorter distance from the top of the lift where the leaching agent is applied, down to the relatively dead material at the bottom of the leach pad.

To improve the permeability of the leach pad, fine ores are sometimes treated with an agglomerating treatment prior to being deposited onto the leach pad so that the fine particles will agglomerate into larger clumps that are more loosely organized. Agglomerated material tends to inhibit the formation of lenses and dams within the lift because it has drainage properties that are similar to gravel. However, agglomerated material is not very resistant to compaction caused by the weight of delivery trucks driving over the agglomerated material after it is deposited on the lift. Consequently, a need exists for improved methods of agglomerating that do not subject the agglomerated materials to compaction forces.

Machines have been proposed for tilling compacted soil as a step in environmental remediation of contaminated soil. For example, U.S. Pat. No. 5,639,182 of Paris describes a method for treating soil in which a treatment material is first spread over the surface of the soil then tilled into the soil by a mixing apparatus. Paris does not disclose the use of the mixing apparatus or process in a precious metals mining operation for extracting metals from ore. The mixing apparatus includes a vertically-oriented endless cutter that is towed behind a tractor over the soil area to be treated. The endless cutter is extended into the soil to a cutting depth and activated to drive the treatment material down into the hard soil and to provide a mixing effect. The soil and treatment material is driven down and around the lower end of the cutter and back up to the soil surface at a location distal of the tractor. The mixed soil and treatment material may be moved to the side of the machine by a lateral conveyor. Because the treatment material is spread on the surface of the soil before mixing, the mixing apparatus may not always mix it evenly throughout the cutting depth. Furthermore, the teeth of the endless cutter are shaped and sized so that fines would tend to remain at the cutting depth without being drawn back to the surface for a more thorough mixing with the treatment material. It would also be ineffective for agglomeration of fines into small clumps because the cutter remains in contact with the soil throughout the mixing process, which would tend to break up agglomerated clumps.

U.S. Pat. No. 5,830,752 of Bruso describes a soil treatment apparatus including a backhoe-type tractor having a boom-mounted endless cutter for tilling soil and an injection system for applying a liquid remediation agent to the soil as it is tilled. Bruso does not disclose the use of the soil treatment apparatus in a precious metals mining operation. Nor does Bruso disclose the use of the apparatus in a leach pad (mining, environmental, or otherwise). The injection system described by Bruso is located along the length of the cutter opposite the tractor for spraying a liquid into the excavated soil. The cutter is much narrower than the width of the tractor, which requires the cutter to be repeatedly dipped and dragged through the soil in multiple swipes to cover the entire width of the path traveled by the tractor. This precludes continuous movement of the tractor along the surface of the soil, results in cutter paths that fan out from the tractor, and tends to lift the tractor each time the cutter is dipped into the soil, all of which diminish the capacity of the apparatus. Similar to the ripper described above (FIG. 3), the apparatus of Bruso tends to leave compacted cells and pillars between adjacent swipes of the cutter. The fanning-out of the swipes amplifies this effect at the distal end of the swipes. In addition, the cutter is positioned to perform an "over-cutting" operation, meaning that the lower end of the cutter is tilted away from the direction of movement of the machine. Over-cutting results in the leading and trailing sides of the cutter being in continuous contact with the soil. For this reason, the apparatus would be ineffective for agglomeration of fines. The cutter also has a tendency to drag tilled soil around the cutter multiple times, which can actually create fines.

Thus, there exists a need for a more effective method and apparatus for reducing compaction in a leach pad and other base materials. Significant opportunities for increasing the yield of a leach pad and for improved in-situ processing also exist.

SUMMARY OF THE INVENTION

In accordance with the present invention, a tilling apparatus is used for breaking up compacted base materials, for example, compacted ore in a leach pad of a precious metals mining operation. The tilling apparatus includes a mobile carrier onto which a tilling head is mounted. The tilling head preferably includes a cutter comprising an endless belt constructed of multiple, linked tilling bits that have teeth that extend across substantially the entire width of the tilling head. The tilling head preferably includes a hydraulic drive motors that operate to drive the endless belt around the tilling head. Thy hydraulic drive motors are powered by the carrier and are coupled to gear boxes, transmission chains, and other mechanical components of the tilling head. Alternatively, the cutter could be powered by other drive means. In operation, the tilling head is extended into the base material to a tilling depth so that a portion of the cutter forms a cutting face of the tilling head that engages and loosens the base material. The tilling head deposits the loosened base material opposite the cutting face.

The tilling apparatus may include an additive delivery system for applying an additive to the loosened base material while it is being deposited or immediately before it is deposited by the tilling head. For example, the additive delivery system may include spray nozzles for applying liquid, powdered, or gaseous additives to the loosened base material as it is thrown from the tilling head. In a preferred embodiment, a control unit for controlling the tilling head may also include an additive management system for controlling the composition and quantity of the additive being applied to the loosened base material. The rate of application of additives can then be automatically controlled based on the grade and size of loosened ore, the type of additive, the velocity of the carrier, the working load on the tilling head, and the speed of the cutter, for example.

As used herein, the term "base material" means any solid or semi-solid material through which a tilling head operating in accordance with the present invention can be conveyed for tilling or mixing the material. Base material may include, without limitation, ores, soil, leach pads, sludge, trash, industrial waste materials, marshland, swamps, riverbeds, and sea floors. The term "additive", as used herein, shall mean any liquid, solid, or gaseous substance that may be applied to the base material as part of a process of chemically and/or physically transforming the base material. Additives can be used for extraction of precious metals and/or for remediation of contaminated soils. Additives may include chemical leaching agents for extraction of metals, including precious metals such as gold, platinum, silver, and copper. Examples of common chemical leaching agents include aqueous solutions of cyanide salts (for gold extraction), including sodium cyanide solution and potassium cyanide solution; dilute sulfuric acid (for copper extraction). Other additives include bioleaching agents such as thiobacillus ferroxidans and leptosprillium ferroxidans bacteria, and agglomerating agents such as milk of lime, fly ash, and portland cement.

The tilling head can be positioned so that the cutting face undercuts the base material to facilitate lifting of the loosened base material over the tilling head and depositing it on a pile formed away from the tilling head opposite the cutting face. So formed, the pile has a slope that is generally inclined at an angle of repose of the loosened base material. This slope serves as a mixing area where additives can be mixed with the base material as it tumbles down the slope. Preferably the tilling head deposits the loosened base material far enough away from the tilling head so that the loosened base material, once deposited, remains substantially undisturbed by the tilling head, even at the tilling depth. A chute can be mounted on the tilling head so that it extends away from the top of the tilling head for carrying the tilled base material far enough away from the tilling head to attain this result.

As used herein, the term "angle of repose" shall mean the steepest slope angle measured from the horizontal that the loosened base material is capable of forming when dropped onto a pile. This definition may vary slightly from accepted definitions of static angle of repose and dynamic angle of repose, which indicate specific test conditions not necessarily applicable to the present invention. The angle of repose is a function of the size and shape of the material that forms the pile, as well as other factors, such as moisture content and the method of forming the pile. Ore of a typical precious metals leach pad has an associated angle of repose ranging between approximately 36° and approximately 39°. However, finer and coarser ores and other base materials may have associated angles of repose ranging from approximately 25° or less to approximately 45° or more.

Additional aspects and advantages of the present invention will be apparent from the following detailed description of a preferred embodiment thereof, which proceeds with reference to the accompanying drawings.

BRIEF DESCRIPTION OF THE DRAWINGS

FIG. 1 is a side elevational view of a prior-art leach pad under construction;

FIG. 3 is a side elevational view of a prior-art ripper with a shank of the ripper shown in the retracted position;

FIG. 5 is a perspective view of the LPR of FIG. 4 with the tilling head shown lowered to an operating position;

FIG. 6 is a diagrammatic side sectional view of the tilling head of the LPR of FIG. 5 in use for tilling a leach pad, which is shown in cross section (most of an endless cutter belt of the tilling head is omitted for clarity);

FIG. 8 is an enlarged partial side view of the cutter belt and the head sprocket of FIG. 7B showing multiple, linked tilling bits of the cutter belt articulating as they round the head sprocket;

FIG. 9 is an enlarged side view of one of the tilling bits of FIG. 8 showing scoop and interleaving feature detail.

DETAILED DESCRIPTION OF A PREFERRED EMBODIMENT

Figure 2:
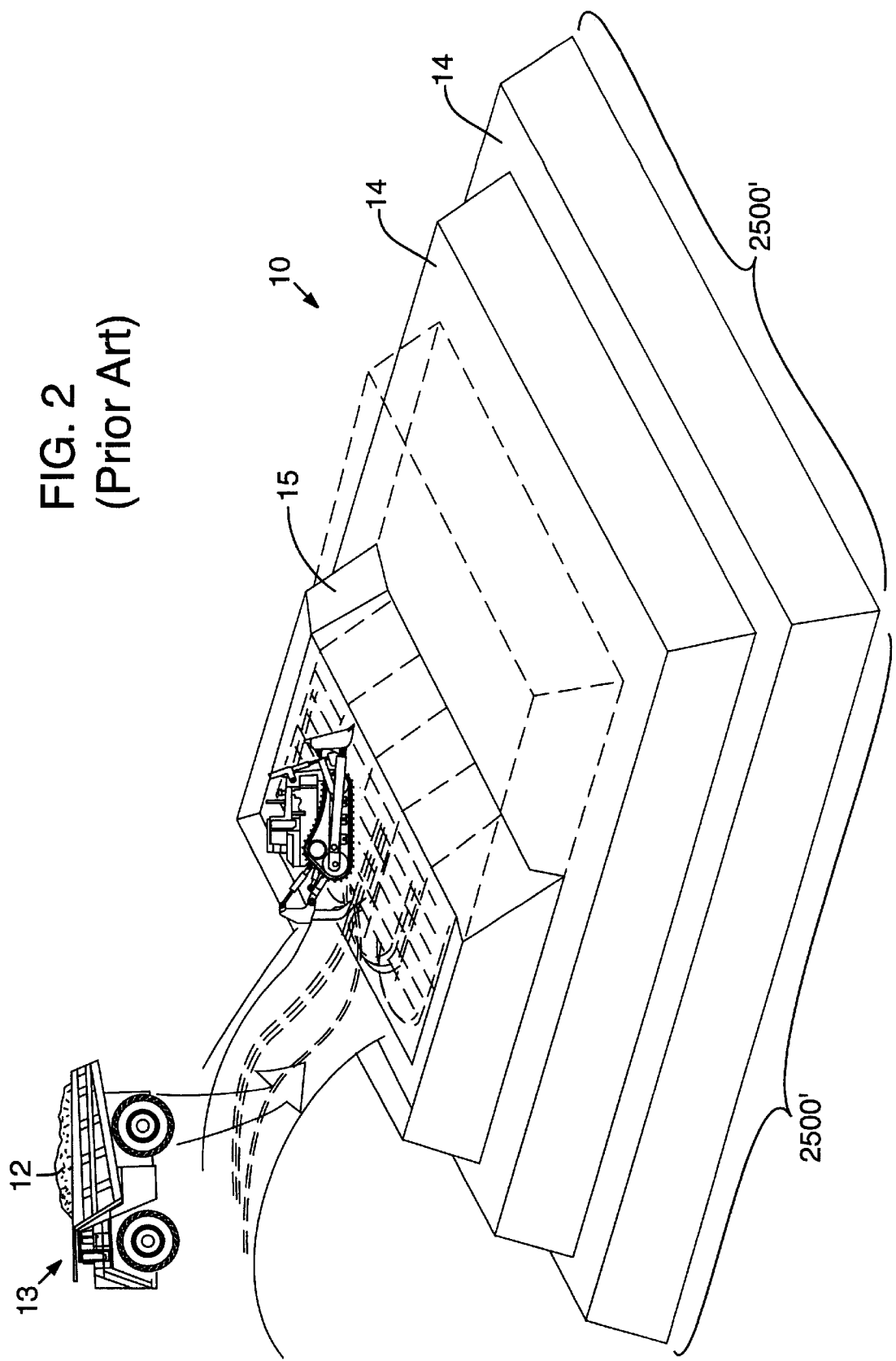
FIG. 2 is a diagrammatic perspective view of a prior-art leach pad showing multiple lifts and a ripper in operation on the surface of the uppermost lift.
Figure 4:
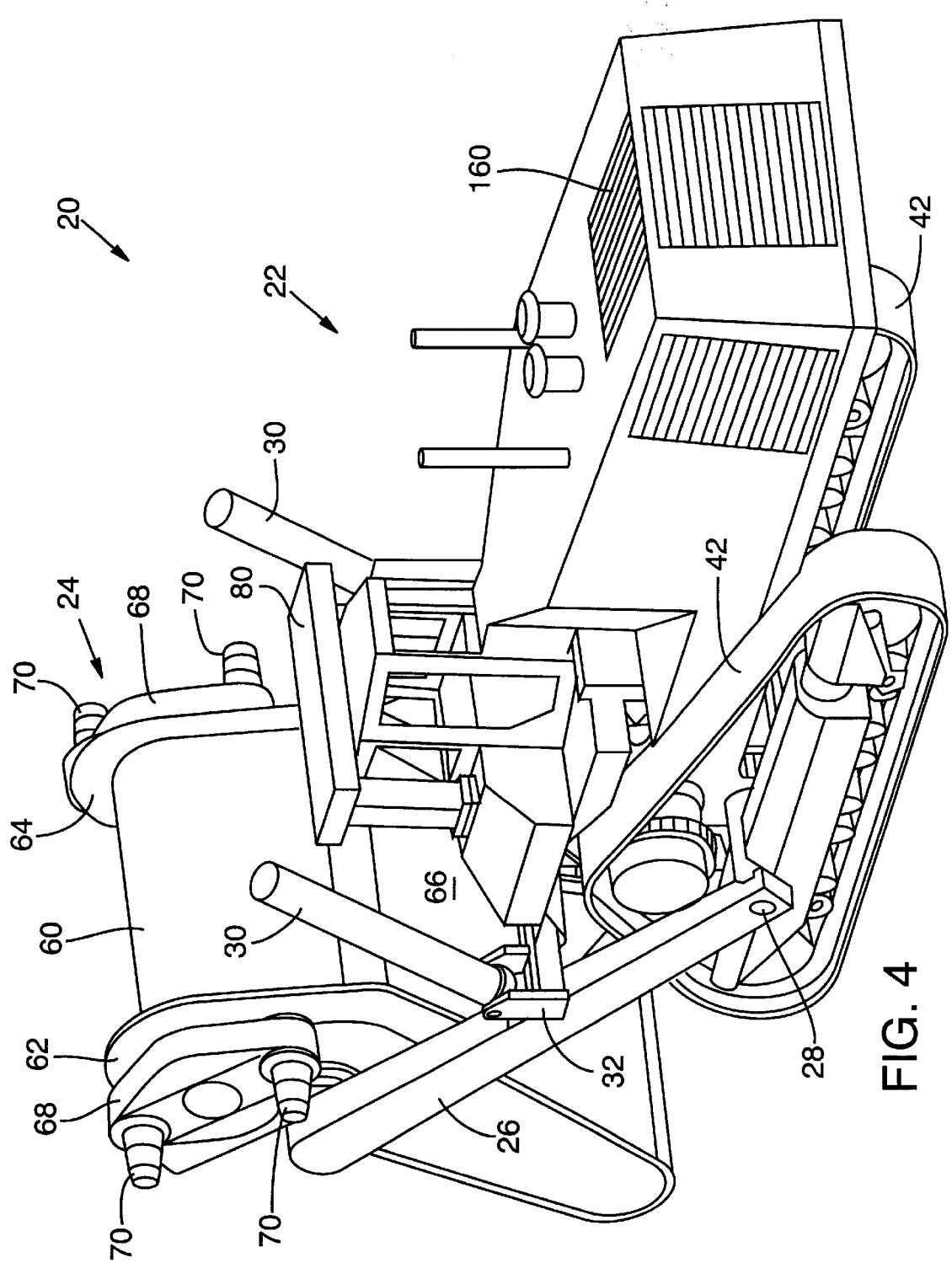
FIG. 4 is a perspective view of a Leach Pad Revitalizer™ (LPRN) in accordance with a preferred embodiment of the present invention showing a tilling head of the LPR raised to a standby position.

FIGS. 4 and 5 illustrate a Leach Pad Revitalizer™ (LPR™) 20 in accordance with a preferred embodiment of the present invention for breaking up and treating compacted ore in a leach pad of a precious metals mining operation. With reference to FIGS. 4 and 5, LPR™ 20 includes a track-type mobile carrier 22 onto which a tilling head 24 is mounted. Tilling head 24 is mounted on mobile carrier 22 by a pair of link arms 26 pivotally connected at their proximal ends to trunnion points 28 of mobile carrier 22. A pair of hydraulic lift cylinders 30 are connected to a clevis 32 of mobile carrier 22. Lift pistons 34 (FIG. 5) of lift cylinders 30 are connected to link arms 26 medially of mobile carrier 22 and tilling head 24. Lift cylinders 30 and lift pistons 34 are operable for lifting tilling head 24 to a raised standby position (FIG. 4) and for plunging tilling head 24 to an operating position (FIG. 5). Mobile carrier 22 includes tracks 42 for moving and steering LPR 20. During a tilling operation, tilling head 24 is lowered to the operating position and tracks 42 are driven so that mobile carrier 22 moves in an operating direction indicated by arrow 44 (FIGS. 5, 6, and 11). Tilling head 24 has a tilling width of approximately 10 feet wide in the embodiment shown, which is substantially equal to the width of mobile carrier 22. Larger and narrower tilling heads could be implemented with modified link arms and lift cylinders (not shown). For example, tilling heads having a tilling width of between 8 feet and 16 feet could be installed on mobile carrier 22.

Tilling head 24 includes an endless cutter belt 60 looped around tilling head 24 between side flanges 62 and 64 of tilling head 24 to form a cutting face 66. A pair of gear boxes 68 mounted to the sides of tilling head 24 drive cutter belt 60 so that it circulates around tilling head 24. Gear boxes 68 are driven by hydraulic motors 70, which are connected by hydraulic hoses (not shown) to one or more hydraulic pumps of mobile carrier 22. A chute 72 extends between side flanges 62, 64 so that cutter belt 60 passes behind chute 72 as it circulates around tilling head 24.

LPR™ 20 is controlled by an operator from within a cab 80 of carrier 22. A control unit (not shown) coupled to mobile carrier 22 and tilling head 24 allows an operator of LPR 20 to monitor and command tilling head 24. Various sensors such as engine RPM sensors, temperature sensors, and pressure sensors (not shown) are placed throughout LPR 20 to provide feedback of important operating conditions. The control unit may include a console (not shown) located inside cab 80 for reporting the operational status of LPR 20 and for adjustment of alarm settings that ensure safe and efficient operation of LPR 20. In addition to displaying sensor feedback and alarm levels, the console can report thermal conditions of LPR 20 based on load history, and can report on the horsepower used for the tilling operation and for forward movement.

Figure 7A:
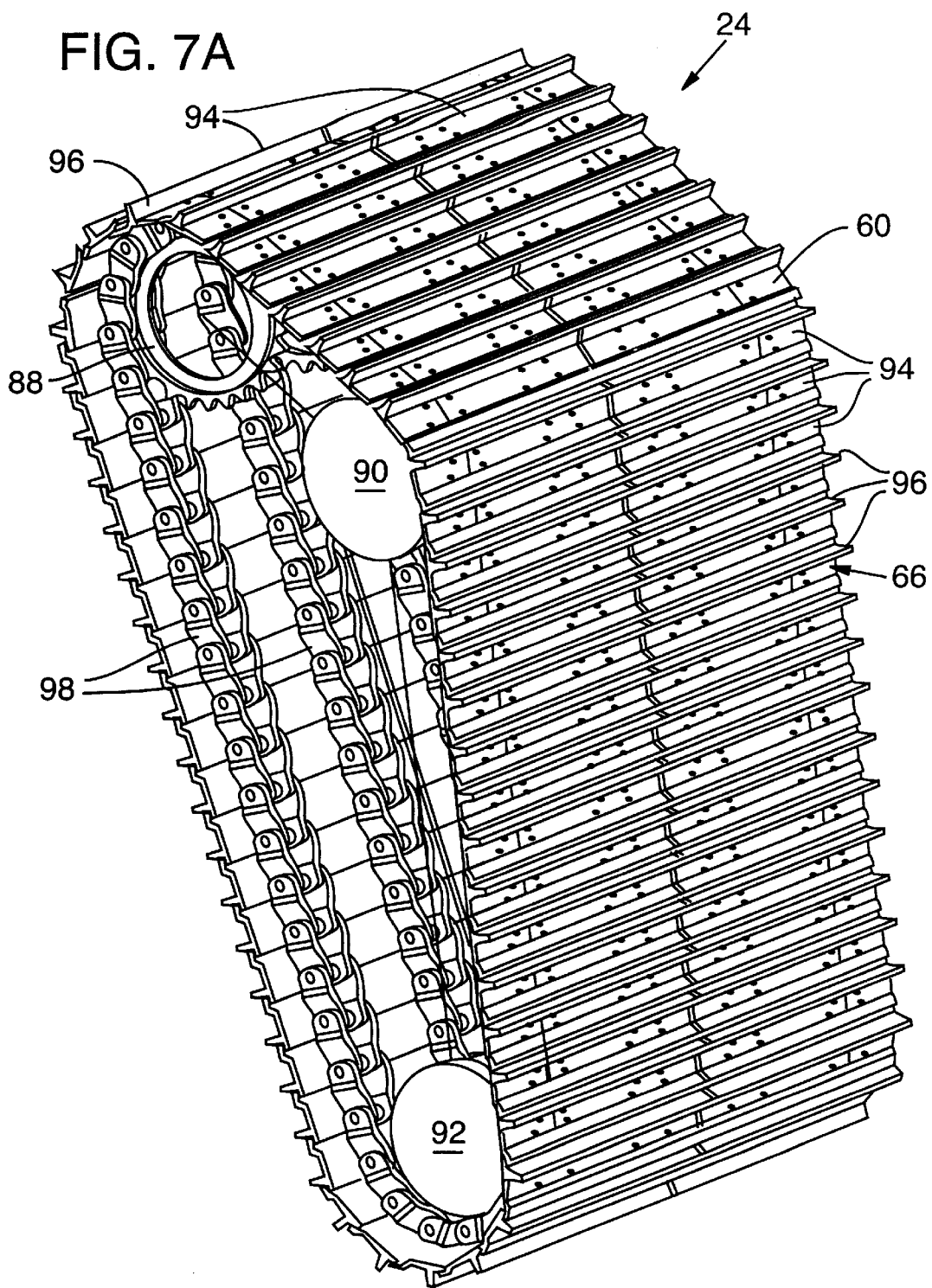
FIG. 7A is an enlarged perspective view of the tilling head of the LPR of FIG. 5 with a hydraulic drive unit of the tilling head omitted and showing a preferred cutter belt of the tilling head that includes two adjacent rows of tilling bits.
Figure 7B:
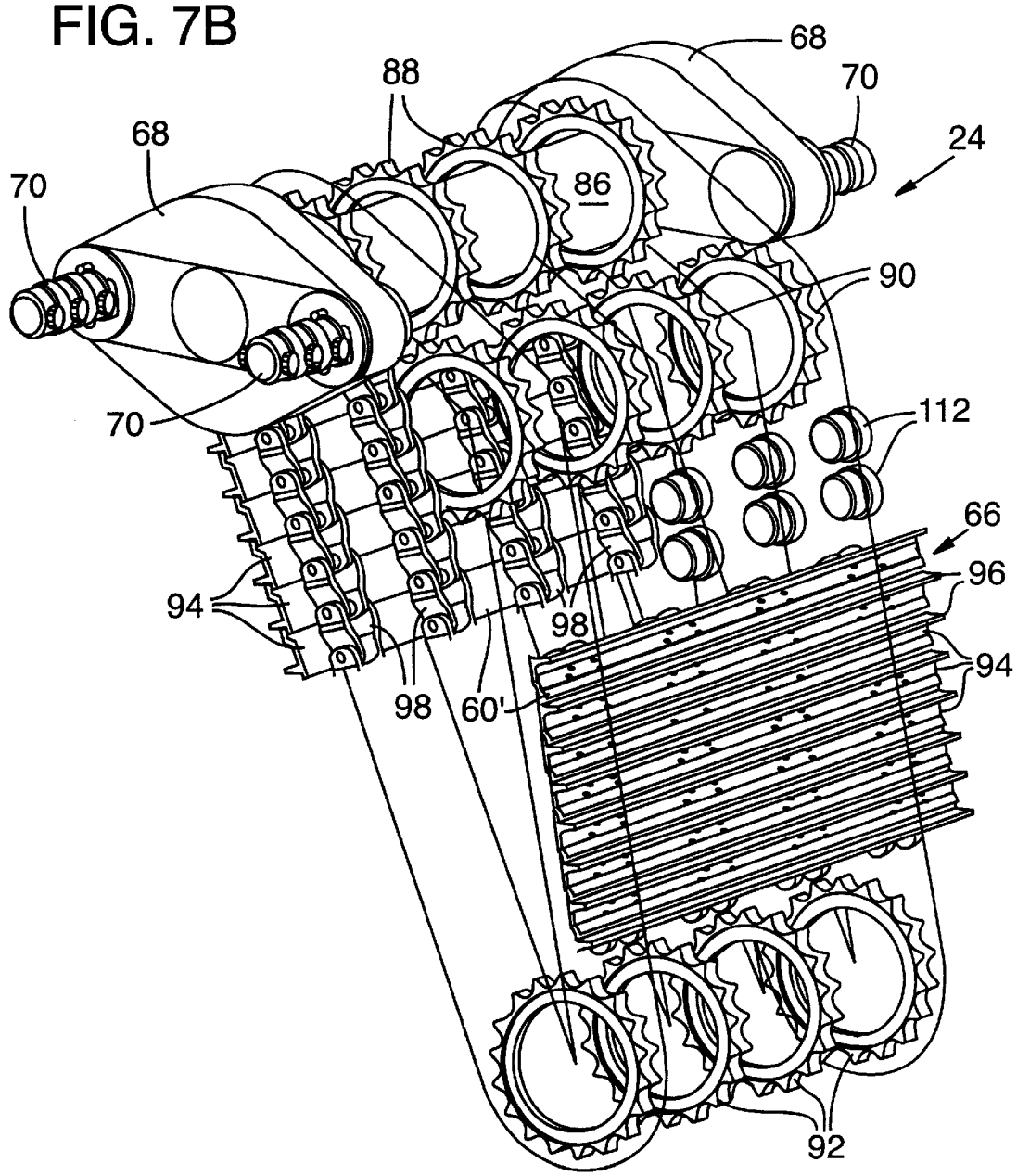
FIG. 7B is a simplified, enlarged perspective view of the tilling head of the LPR of FIG. 5 showing an alternative cutter belt having a single row of tilling bits, with portions of the tilling head and cutter belt omitted to show the arrangement of head and idler sprockets, power transmission components, and other parts of the tilling head and cutter belt.

FIG. 6 is a diagrammatic side sectional view of tilling head 24 lowered to the operating position with most of cutter belt 60 omitted for clarity. Dashed lines 84 show the path traveled by cutter belt 60. FIG. 7A is an enlarged perspective view of tilling head 24 with its hydraulic motors 70 and gear boxes 68 omitted and showing a preferred embodiment of cutter belt 60. FIG. 7B is a simplified perspective view of tilling head 24 including an alternative cutter belt 60', with sections of cutter belt 60' and tilling head 24 omitted to show internal details of tilling head 24. Referring now to FIGS. 6, 7A, and 7B, a head shaft 86 extends between gear boxes 68 and rotatably supports multiple head sprockets 88. Two sets of idler sprockets 90, 92 together with head sprockets 88 support cutter belt 60, 60' and define the path 84 traveled by cutter belt 60, 60'. Cutter belt 60, 60' is composed of multiple, linked tilling bits 94 that articulate as they pass around head sprockets 88 and idler wheels 90, 92. As seen most clearly in FIGS. 7A and 7B, tilling bits 94 have teeth 96 that extend the width of tilling head 24. In the preferred embodiment cutter belt 60 (FIG. 7A), cutter belt 60 comprises two rows of tilling bits 94 having teeth 96, each row being supported by a pair of transmission chains 98 lining together tilling bits 94. The two rows of tilling bits 94 can be aligned with their teeth 96 substantially adjacent so that teeth 96 effectively extend across the entire width of tilling head 24. In the alternative embodiment cutter belt 60' (FIG. 7B), a single row of tilling bits 94' extends across the entire width of tilling head 24. In both embodiments, transmission chains 98 are driven over head shaft 86 by gear boxes 68 to thereby drive cutter belt 60 around tilling head 24. To reduce manufacturing costs, transmission chains 98, head sprockets 88, and idler wheels 90, and 92 could be made from commercially available components of the type used on drive tracks of track vehicles such as tracks 42 of mobile carrier 22, for example.

As shown most clearly in FIG. 6, tilling head 24 is oriented when in the operating position so that cutting face 66 undercuts a compacted portion 102 of a leach pad 104. In typical operation, cutter belt 60 is driven in the direction indicated by arrows 108 to engage and loosen ore in compacted portion 102 of leach pad 104. In operation, ore is carried up and over tilling head 24 where it drops onto chute 72 and is eventually deposited in a tilled pile 110. A set of support rollers 112 fly support cutter belt 60 at cutting face 66 to facilitate loosening of compacted ore. Tilling head 24 tills down to a tilling depth 116 of approximately 10 feet below an upper surface 114 of leach pad 104. Alternative configurations of LPR 20 could result in a greater or lesser tilling depth.

FIG. 8 is an enlarged partial side view of tilling head 24 showing tilling bits 94 of cutter belt 60 articulating as tilling bits 94 round head sprockets 88. FIG. 9 is an enlarged side view of an individual tilling bit 94. With reference to FIGS. 8 and 9, adjacent tilling bits 94 overlap to prevent ore from passing between them. Tilling bits 94 each include a formed portion 120 terminating in a trailing edge 122 of tilling bit 94. Formed portion 120 is sized and shaped to cradle a leading portion 124 of an adjacent tilling bit 94 (FIG. 8) to thereby prevent tilling bits 94 from spreading apart and admitting ore between them as they round head sprockets 88. Leading portion 124 of tilling bit 94 is also shaped to nest behind an inside face 126 of formed portion 120 of an adjacent tilling bit 94 to further prevent bit separation. Alternatively, standard track shoe material and grouser bars could be used as tilling bits, thereby decreasing the cost of cutter belt 60, but resulting in gaps that would introduce greater amounts of loosened ore into the interior of tilling head 24 and impose greater loads on hydraulic motors 70.

Figure 10:
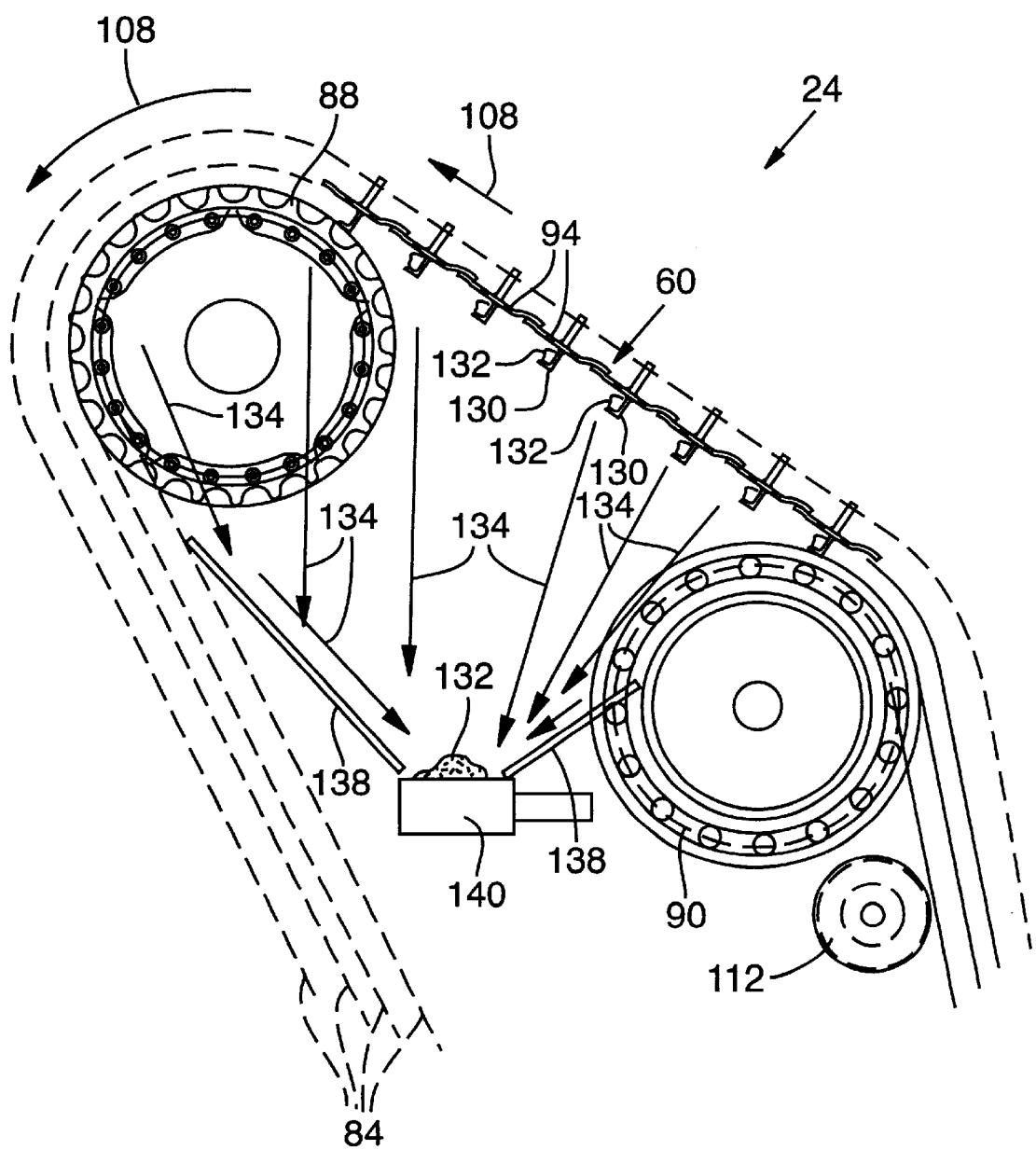
FIG. 10 is an enlarged partial side view of the tilling head of FIG. 6 showing the scoops of the cutter belt carrying and transferring loose ore onto catch slides and a clearing conveyor located within the tilling head.

Each tilling bit 94 includes a scoop 130 that extends inwardly along the width of tilling bit 94 for catching any loose ore or debris that has entered the interior of tilling head 24, as described more fully below. FIG. 10 is a enlarged partial side view of an upper section of tilling head 24 detailing a tilling head clearing system. With reference to FIG. 10, scoops 130 carry loose debris 132 upwardly, dropping it (as indicated by arrows 134) when cutter belt 60 rounds idler sprockets 90 and head sprockets 88. Catch slides 138 within tilling head 24 direct loose debris 132 to a clearing conveyor 140 that moves loose debris 132 laterally and to the side of tilling head 24.

With reference again to FIGS. 4–6, LPR™ 20 includes a leachate management system 160 located in mobile carrier 22 and controlled by the control unit. Leachate management system 160 delivers a leaching agent to tilling head 24 for application to loosened ore as the loosened ore is deposited back onto leach pad 104 (FIG. 6). A leachate supply line 164 located under chute 72 delivers leaching agent to spray nozzles 168 that spray leaching agent 170 onto loosened ore from below as the ore travels over chute 72 and onto tilled pile 110. Leachate management system 160 includes, but is not limited to, a flow control valve and mixing valves (not shown) for controlling the composition as well as the quantity of leaching agent supplied to tilling head 24.

Referring now to FIG. 6, a preferred method of operation will be described. LPR™ 20 (FIG. 5) is positioned on upper surface 114 of leach pad 104 and tilling head 24 is lowered to the operating position. As described above, cutter belt 60 is driven in the direction of arrows 108 to engage and loosen ore in compacted portion 102 of leach pad 104. In operation, loosened ore is carried up and over tilling head 24 and is subsequently deposited onto tilled pile 110. Because the loosened ore is deposited away from tilling head 24, a void 186 forms behind tilling head 24. Tilled pile 110 has a slope 190 that is generally inclined at an angle θ that is substantially equal to an angle of repose of the loosened ore. Slope 190 serves as a mixing area where the leaching agent mixes with the loosened ore as it tumbles downwardly along slope 190 in the direction of arrow 192. Chute 72 ensures that the loosened ore is deposited far enough away from tilling head 24 so that the loosened ore remains undisturbed by tilling head 24, even at tilling depth 116.

The angle of repose and untouched mixing area are particularly important in an alternative embodiment (not shown) in which an agglomerate additive such as milk of lime is applied by spray nozzles 168. The tumbling effect of the mixing area helps to agglomerate fine ores into larger sized clumps that resist channeling of subsequently-applied leaching agent as the leaching agent percolates through leach pad 104.

It will be obvious to those having skill in the art that many changes may be made to the details of the above-described embodiment of this invention without departing from the underlying principles thereof. The scope of the present invention should, therefore, be determined only by the following claims.

What is claimed is:

1. An apparatus for treating a base material, the base material having an upper surface, comprising:
   a tilling head positionable in the base material, the tilling head including an endless cutter that forms a cutting face of the tilling head, the cutting face oriented for undercutting the base material when the tilling head is positioned in the base material;
   a movable carrier supporting the tilling head, the carrier adapted for travel generally over the upper surface of the base material to draw the tilling head through the base material; and
   a tiller drive mechanism operably coupled to the endless cutter for circulating the endless cutter to engage and loosen the base material at the cutting face, carry the loosened base material upwardly along the cutting face, and deposit at least a portion of the loosened base material onto a slope away from the tilling head opposite the cutting face to thereby form a void between the tilling head and the slope.

2. The apparatus of claim 1, wherein comprising a pair of link arms connecting the tilling head to the movable carrier, the link arms rotatably connected to the mobile carrier for lowering the tilling head into the base material and for raising the tilling head above the upper surface of the base material.

3. The apparatus of claim 1, further comprising:
   a chute positioned adjacent the tilling head for transporting the loosened base material away from the tilling head.

4. The apparatus of claim 1, further comprising an additive delivery system operably coupled to the tilling head and positioned to apply an additive to the loosened base material.

5. The apparatus of claim 4 in which the additive delivery system includes spray nozzles for spraying the additive onto the loosened base material as it is deposited by the circulating of the endless cutter.

6. The apparatus of claim 4, further comprising an additive management system operably connected to the additive delivery system for controlling a rate of application of the additive.

7. The apparatus of claim 4, in which the additive is formulated to include multiple additive components mixed together by the additive delivery system and, further comprising:

an additive management system operably connected to the additive delivery system for controlling the formulation of the additive.

8. The apparatus of claim 4, further comprising a feedback sensor operably connected to the additive delivery system, the feedback sensor selected from the group consisting of:

(a) an engine RPM sensor;

(b) a temperature sensor; and (c) a pressure sensor.

9. The apparatus of claim 4 in which the additive applied by the additive delivery system is selected from the group consisting of:

(a) a liquid, (b) a solid, (c) a gas, (d) a chemical leaching agent, (e) an aqueous cyanide salt solution, (f) an aqueous sodium cyanide solution, (g) an aqueous potassium cyanide solution, (h) an aqueous sulfuric acid solution, (i) a bioleaching agent, (j) thiobacillus ferroxidans bacteria, (k) leptosprillium ferroxidans, (l) an agglomerating agent, (m) milk of lime, (n) fly ash, and (o) portland cement.

10. The apparatus of claim 4 in which the slope forms a mixing area where the additive is mixed with the loosened base material as it tumbles down the slope.

11. The apparatus of claim 1 in which the endless cutter includes multiple tilling bits that are linked together and overlapping.

12. The apparatus of claim 1, further comprising a tilling head clearing system positioned within the tilling head for removing loose debris from within the tilling head during operation of the tilling head.

13. The apparatus of claim 12 in which the endless cutter of the tilling head includes an interior region and multiple linked tilling bits, each of the tilling bits including a scoop extending into the interior of the endless cutter to carry the loose debris upwardly as the endless cutter is circulated.

14. The apparatus of claim 13 in which the scoops of the tilling bits drop the loose debris as the tilling bits pass over the top of the tilling head and, further comprising:

a clearing conveyor positioned within the endless cutter to catch the loose debris that is dropped from the scoops of the tilling bits and to convey said loose debris out of the tilling head.

15. The apparatus of claim 1 in which the endless cutter has a width and includes multiple tilling bits, each of the tilling bits including a cutting tooth, and the cutting teeth extending substantially the entire width of the endless cutter.

16. The apparatus of claim 1 in which:

the tilling head extends downwardly into the base material to a tilling depth; and the tilling head deposits loosened base material far enough away from the tilling head so that the void extends down to the tilling depth to thereby prevent the loosened base material from being recirculated by the endless cutter.

17. The apparatus of claim 1 in which the tilling head is as wide as the carrier.

18. The apparatus of claim 1 in which the tilling head is between 8 and 16 feet wide.

* * * * *

UNITED STATES PATENT AND TRADEMARK OFFICE
CERTIFICATE OF CORRECTION

PATENT NO. : 6,508,608 B1 Page 1 of 1
DATED : January 21, 2003
INVENTOR(S) : Ron Nilson and Thomas C. Stone It is certified that error appears in the above-identified patent and that said Letters Patent is hereby corrected as shown below:

Column 5,
Line 23, "LPRN" should read -- LPR$^{TM}$ --.

Column 6,
Line 63, "lining" should read -- linking --.

Column 7,
Line 18, "fly" should read -- firmly --.

Column 8,
Line 53, "wherein" should read -- further --.

Signed and Sealed this

Twenty-first Day of October, 2003

JAMES E. ROGAN
*Director of the United States Patent and Trademark Office*